UNITED STATES PATENT OFFICE.

JAMES R. BRADLEY AND EDWARD DE CAMP, OF MORRISTOWN, NEW JERSEY.

IMPROVEMENT IN THE MANUFACTURE OF IRON AND STEEL.

Specification forming part of Letters Patent No. 130,787, dated August 27, 1872.

*To all whom it may concern:*

Be it known that we, JAMES R. BRADLEY and EDWARD DE CAMP, of the city of Morristown, in the county of Morris and State of New Jersey, have invented new and useful Improvements in the Manufacture of Iron and Steel; and we do hereby declare that the following is a full and exact description thereof:

The nature of our invention consists in purifying the iron by expelling the carbon, phosphorus, sulphur, silica, and other impurities by introducing into the same, when in a bath or melted state in the furnace, scrap-iron or steel, to bring the mass into the required state, when we introduce chloride of calcium, or the material known as the Stevens flux, in variable quantities, as circumstances may require. The mass is then subjected to a high degree of heat, when we inject into the bath a jet of steam and carbonic-acid gas by any suitable or well-known means, by which the bath is thoroughly agitated and the current of steam and carbonic-acid gas is completely diffused through the mass of metal, after which a sufficient amount of carbon is added by introducing pig-iron in sufficient or in any desired quantity, after which a cold or hot blast of air is introduced, holding the iron in a liquid state.

In the manufacture of steel we purify the iron and proceed in the same manner as above described, when we introduce into the bath or melted iron carbonate of iron mixed with charcoal in the following proportions—to, viz, three parts of carbonate of iron to eight parts of charcoal to each ton of iron; we place these in a closed box of wood or other suitable material, which is introduced and passed to the bottom of the bath or melted iron, and held there until the box is consumed, and the contents, set free from the box, completely permeate the mass, which completes the process, and leaves the iron or steel in a perfectly pure state.

Having thus described our invention, what we claim as new, and desire to secure by Letters Patent of the United States, is—

In connection with the above-described process, the use of carbonate of iron, in the manner substantially as described.

JAMES R. BRADLEY.
EDWARD DE CAMP.

Witnesses:
    CHAS. ROGERS,
    FRANK ROGERS.